United States Patent
Williams et al.

(10) Patent No.: US 10,258,166 B2
(45) Date of Patent: Apr. 16, 2019

(54) CHILD RESTRAINT SEAT

(71) Applicant: Wonderland Switzerland AG, Steinhausen (CH)

(72) Inventors: Bruce Williams, Narvon, PA (US); Gregory Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/043,141

(22) Filed: Jul. 23, 2018

(65) Prior Publication Data

US 2018/0325279 A1    Nov. 15, 2018

Related U.S. Application Data

(62) Division of application No. 15/715,182, filed on Sep. 26, 2017, now Pat. No. 10,058,192.

(60) Provisional application No. 62/404,921, filed on Oct. 6, 2016.

(51) Int. Cl.
| | |
|---|---|
| *A47D 1/04* | (2006.01) |
| *A47D 1/10* | (2006.01) |
| *B60N 2/28* | (2006.01) |
| *B62B 7/14* | (2006.01) |

(52) U.S. Cl.
CPC ............. *A47D 1/10* (2013.01); *A47D 1/04* (2013.01); *B60N 2/2821* (2013.01); *B60N 2/2842* (2013.01); *B62B 7/142* (2013.01); *B62B 7/145* (2013.01)

(58) Field of Classification Search
CPC .... B60N 2/2821; B60N 2/2842; B62B 7/145; B62B 7/142; A47D 1/10; A47D 1/04
USPC ............................................ 297/130, 256.16
See application file for complete search history.

(56) References Cited

U.S. PATENT DOCUMENTS

| | | | | |
|---|---|---|---|---|
| 5,947,555 | A * | 9/1999 | Welsh, Jr. ............... | B62B 7/142 280/30 |
| 7,370,913 | B2 * | 5/2008 | Takamizu ............ | B60N 2/2848 297/256.16 |
| 7,597,396 | B2 * | 10/2009 | Longenecker ....... | B60N 2/2806 297/253 |
| 8,033,555 | B2 * | 10/2011 | Mostert ................ | B60N 2/2848 280/47.38 |
| 8,876,208 | B2 | 11/2014 | Heisey | |

* cited by examiner

*Primary Examiner* — Milton Nelson, Jr.
(74) *Attorney, Agent, or Firm* — Winston Hsu

(57) ABSTRACT

A child restraint seat includes a seat unit, a locking mechanism and a releasing handle. The locking mechanism is disposed on the seat unit and adapted to fix the seat unit onto a first external structural unit. The locking mechanism includes a latch base disposed on the seat unit, a first latching component movably disposed on the latch base, and a lock releasing component connected to the first latching component. The first latching component is adapted to move relative to a first constraining component of the first external structural unit for switching between a closed position and an open position. The releasing handle is disposed on the seat unit and connected to the lock releasing component, the releasing handle is utilized to drive the lock releasing component to move the first latching component from the closed position to the open position.

11 Claims, 14 Drawing Sheets

CHILD RESTRAINT SEAT

CROSS REFERENCE TO RELATED APPLICATIONS

This application is a divisional application of and claims the benefit of U.S. Pat. No. 10,058,192 filed Sep. 26, 2017 The U.S. Pat. No. 10,058,192 filed Sep. 26, 2017 claims the benefit of U.S. provisional application No. 62/404,921 filed on Oct. 6, 2016.

BACKGROUND OF THE INVENTION

1. Field of the Invention

The present invention relates to a child restraint system, and more particularly, to a child restraint capable of being detachably assembled with an external structural unit, such as a stroller or a restraint base.

2. Description of the Prior Art

Many conventional child restraints include a restraint base that can be installed in a vehicle and a restraint seat that can be attached to the base for transporting a child in the vehicle, or detached to transport a child outside of the vehicle. Many of these restraint seats also have the ability to be attached to a stroller, conveniently allowing for the child to be transported in a stroller without first removing the child from the restraint seat. The connection between the restraint seat and the stroller needs to be reliable and convenient to secure and release. Multiple attachment mechanisms and release actuators are typically used on the same restraint seat, requiring the user to counter-intuitively use different actuators to release the restraint seat from the restraint base and strollers.

SUMMARY OF THE INVENTION

The present invention provides a child restraint seat capable of being detachably assembled with an external structural unit, such as a stroller or a restraint base, for solving above drawbacks.

According to the claimed invention, a child restraint seat capable of being detachably assembled with a first external structural unit is disclosed. The restraint seat includes a seat unit, a locking mechanism and a releasing handle. The locking mechanism is disposed on the seat unit and adapted to fix the seat unit onto the first external structural unit. The locking mechanism includes a latch base disposed on the seat unit, a first latching component movably disposed on the latch base, and a lock releasing component connected to the first latching component. The first latching component is adapted to move relative to a first constraining component of the first external structural unit for switching between a closed position and an open position. The releasing handle is disposed on the seat unit and connected to the lock releasing component, the releasing handle is utilized to drive the lock releasing component to move the first latching component from the closed position to the open position.

According to the claimed invention, the child restraint seat further includes a second latching component movably disposed on the seat unit and adapted to move relative to a second constraining component of a second external structural for switching between a closed position and an open position, the second latching component being connected to the releasing handle, the releasing handle is utilized to switch the first latching component from the closed position to the open position and switch the second latching component from the closed position to the open position simultaneously. The releasing handle is connected to the lock releasing component and the second latching component respectively via connective cables.

According to the claimed invention, the first latching component comprises an axle portion and an engaging portion, the axle portion is rotatably connected with the latch base, the engaging portion is connected with the axle portion and contact against or is separated from the first constraining component according to rotation of the axle portion. The first latching component further includes an inclined portion disposed on the engaging portion and adapted to slide relative to the first constraining component for rotating the axle portion. The lock releasing component is connected with the axle portion and is pulled by the releasing handle to rotate the engaging portion to contact against and be separated from the first constraining component. The locking mechanism further includes a slot structural component disposed on the seat unit, and the lock releasing component is slidably disposed inside the slot structural component for linear constraint. The locking mechanism further includes a resilient component disposed between the latch base and the axle portion.

According to the claimed invention, the first latching component includes a stretching portion and an engaging portion, an end of the stretching portion is fixed onto the latch base, and the engaging portion is disposed on the other opposite end of the stretching portion. The lock releasing component is rotatably disposed on the first latching component, a first end of the lock releasing component is connected of the releasing handle, and a second end of the lock releasing component different from the first end is rotated to contact against the first constraining component for deforming the stretching portion. The engaging portion is separated from the first constraining component via deformation of the stretching portion. The lock releasing component is rotatably disposed on the stretching portion, and a length of the second end of the lock releasing component is greater than a length of the engaging portion. The locking mechanism further includes a resilient component disposed between the lock releasing component and the first latching component.

According to the claimed invention, the first latching component includes a bridging portion, a crooked portion and an engaging portion, the crooked portion whereon the lock releasing component is accommodated is disposed on a middle of the bridging portion, a first end of the bridging portion is fixed onto the latch base, and a second end of the bridging portion opposite to the first end is connected to the engaging portion. The lock releasing component is movably accommodated inside the crooked portion and slidably contacts against a restrict portion of the latch base, a slide of the lock releasing component relative to the restrict portion drives deformation of the bridging portion for shifting the engaging portion. The lock releasing component is slide inside the crooked portion, the bridging portion is deformed and the engaging portion is separated from the first constraining component. A sunken structure of the crooked portion has two ends with different depths, and the lock releasing component having two ends with different widths is movably accommodated inside the sunken structure. While a large-width end of the lock releasing component is moved from a deep-depth end of the sunken structure to a shallow-depth end of the sunken structure, a part of the lock releasing component protrudes from the sunken structure to space the bridging portion from the latch base.

The child restraint seat of the present invention utilizes the locking mechanism to fix the seat unit onto the external structural unit. The locking mechanism preferably has two first latching components respectively disposed on each handle of the seat unit, and has one second latching component disposed on the rear or the front of the seat unit. The first latching component can be engaged with and disengaged from the first constraining component via deformation or rotation; when the seat unit is fully installed on the external structural unit, the first latching component can be automatically returned from the open position to the closed position. Besides, the seat unit can be removed from the external structural unit by actuating the releasing handle which simultaneously moves the first latching component and the second latching component to leave the first constraining component and the second constraining component for convenient operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
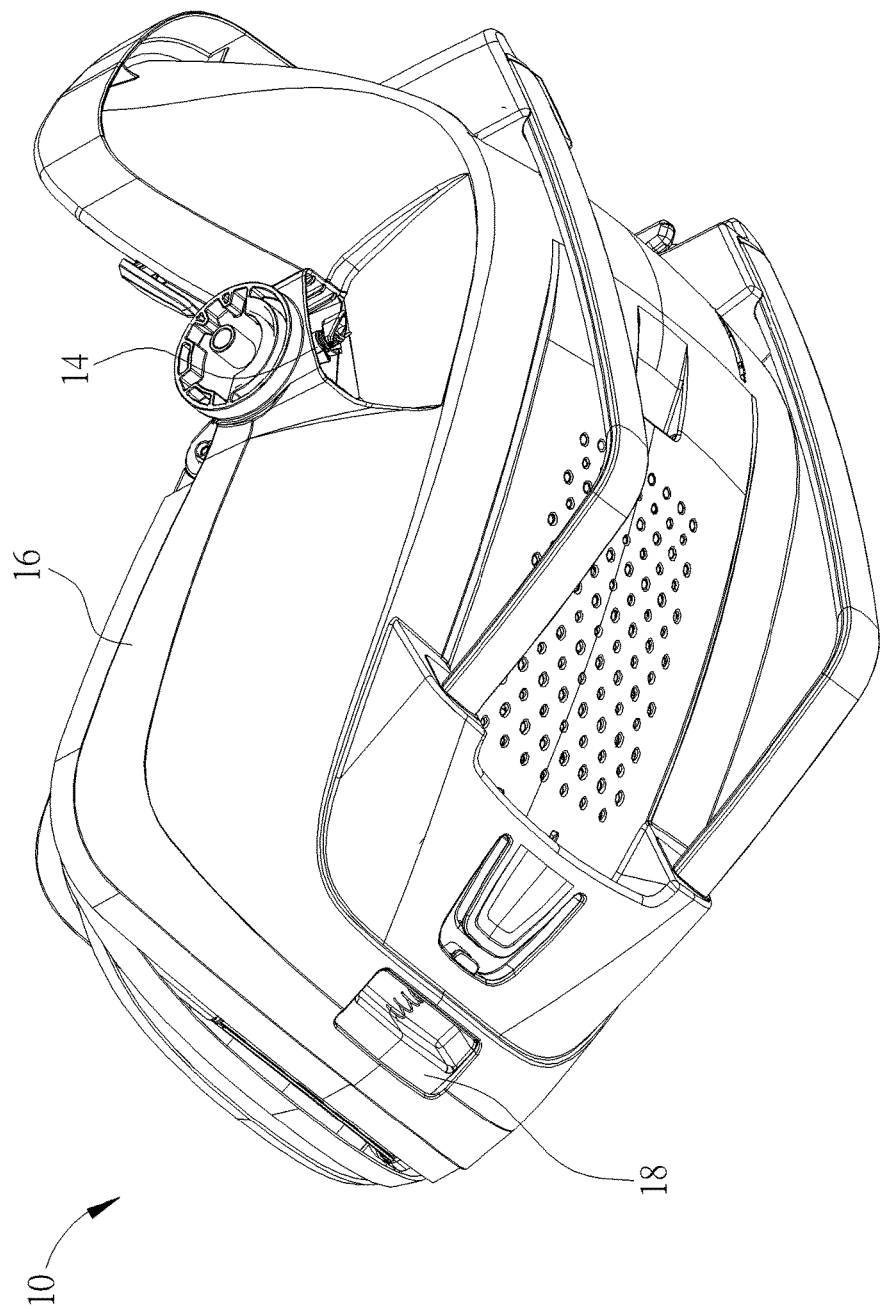
FIG. 1 is a diagram of a child restraint seat according to an embodiment of the present invention.
Figure 2:
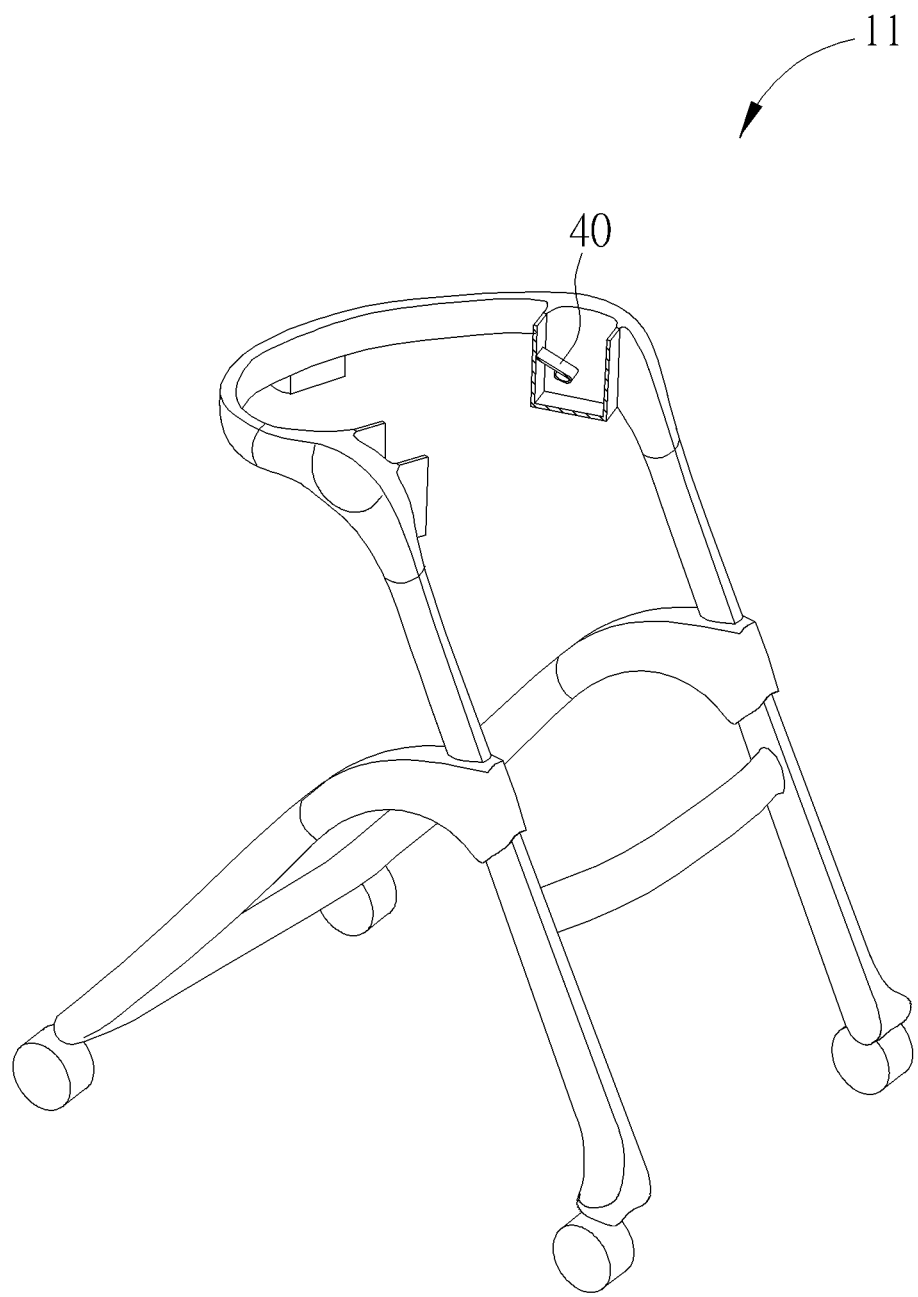
FIG. 2 is a diagram of a first external structural unit according to the embodiment of the present invention.
Figure 3:
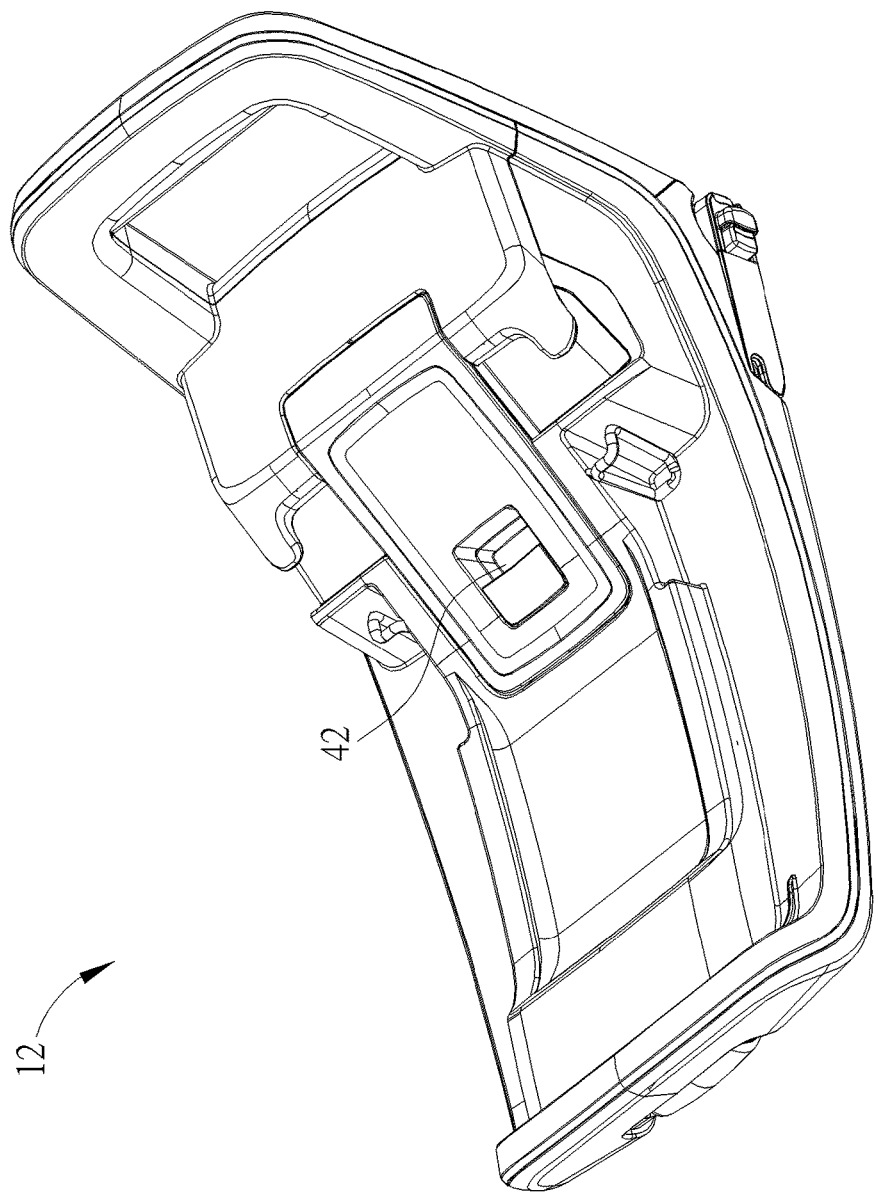
FIG. 3 is a diagram of a second external structural unit according to the embodiment of the present invention.
Figure 4:
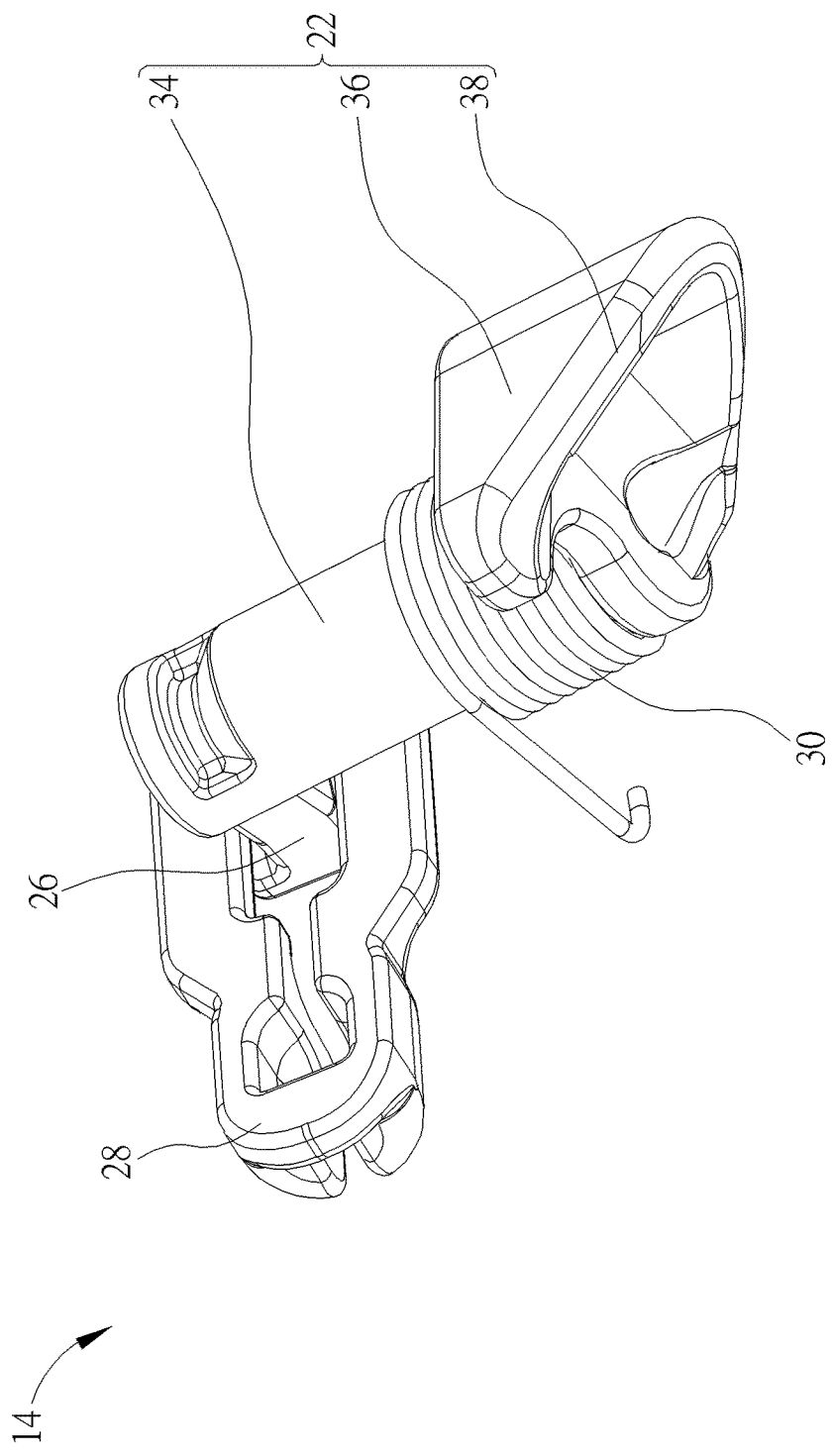
FIG. 4 and FIG. 5 respectively are diagrams of a locking mechanism in different views according to a first embodiment of the present invention.
Figure 5:
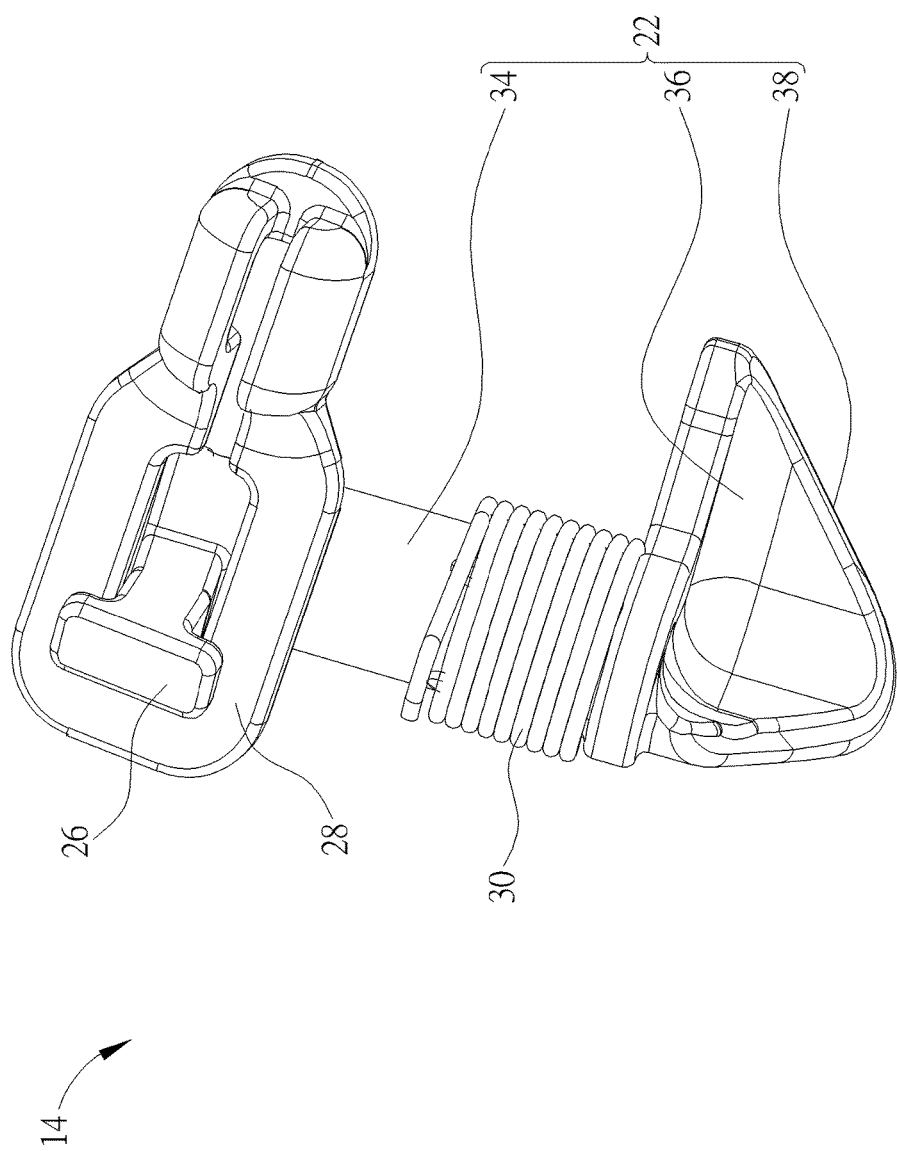
Figure 6:
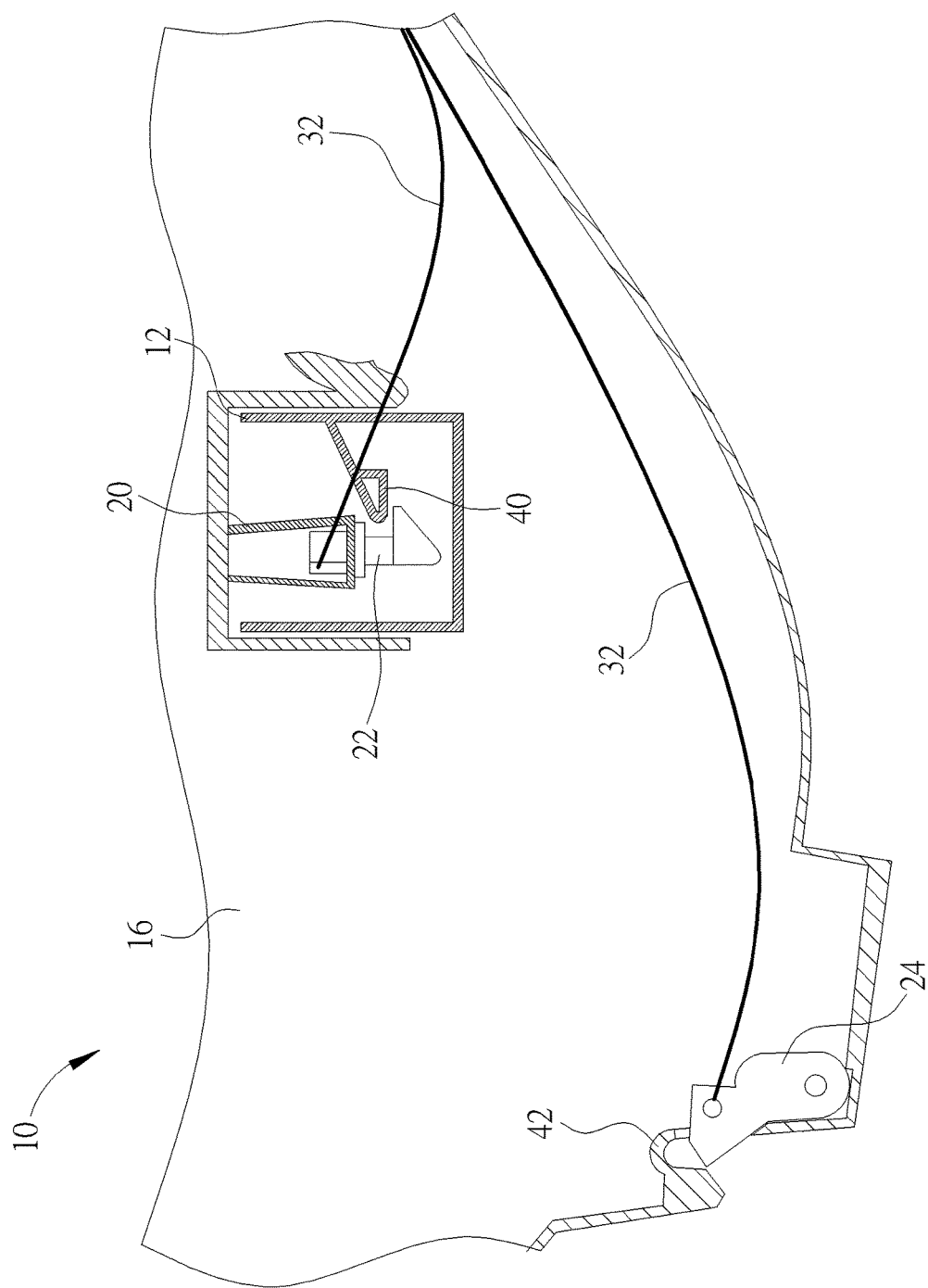
FIG. 6 and FIG. 7 respectively are sectional views of the child restraint seat and the external structural unit indifferent operation modes according to the first embodiment of the present invention.
Figure 7:
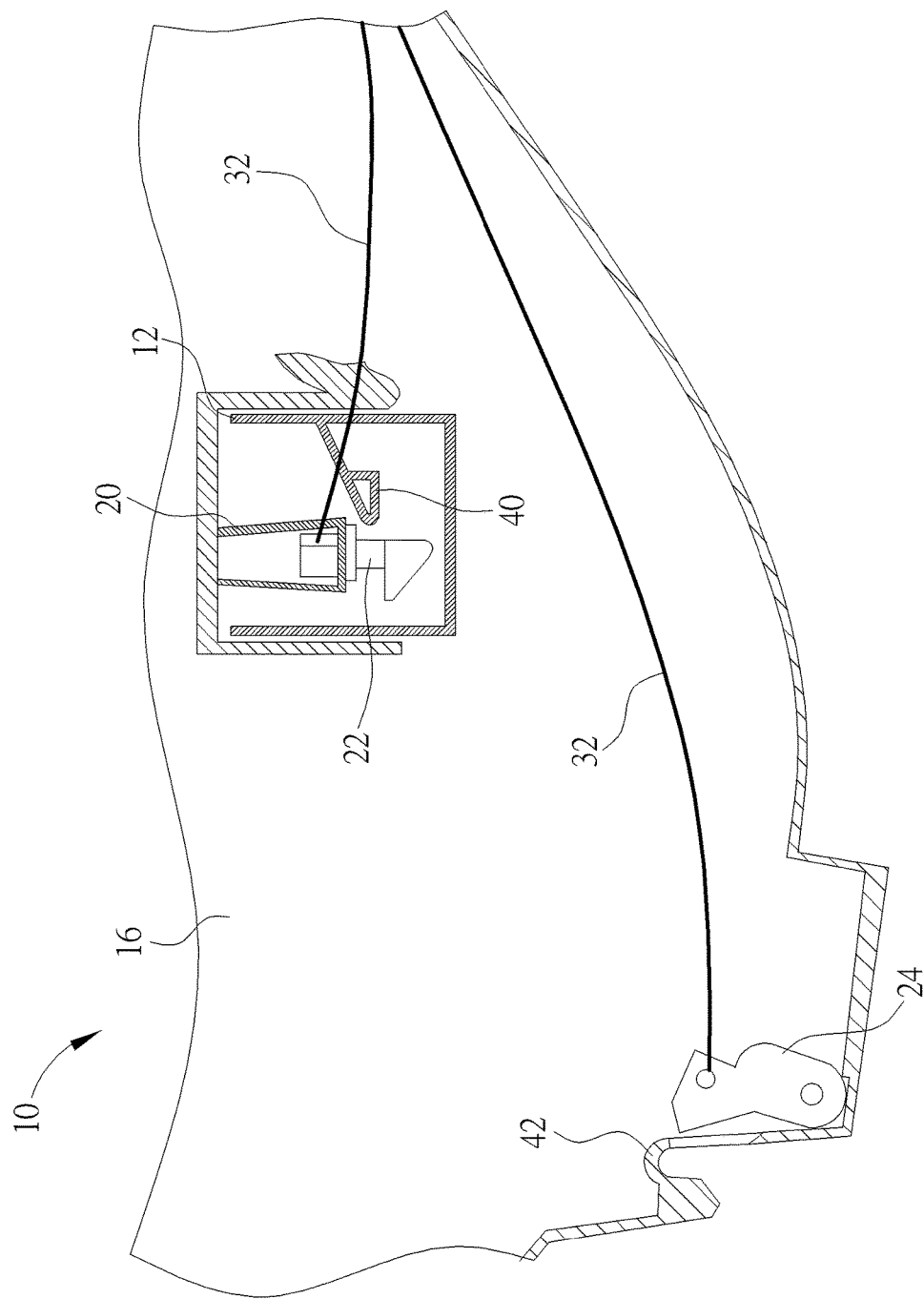

Please refer to FIG. 1 to FIG. 7. FIG. 1 is a diagram of a child restraint seat 10 according to an embodiment of the present invention. FIG. 2 is a diagram of a first external structural unit 11 according to the embodiment of the present invention. FIG. 3 is a diagram of a second external structural unit 12 according to the embodiment of the present invention. FIG. 4 and FIG. 5 respectively are diagrams of a locking mechanism 14 in different views according to a first embodiment of the present invention. FIG. 6 and FIG. 7 respectively are sectional views of the child restraint seat 10 and the external structural unit 12 in different operation modes according to the first embodiment of the present invention. In a possible situation, the first external structural unit 11 can be a stroller, the child restraint seat 10 can be assembled with the first external structural unit 11 via a first latching component 22; in another possible situation, the second external structural unit 12 can be a restraint base installed on a car seat(not shown in figures), and the child restraint seat 10 can be detachably assembled with the second external structural unit 12 via a second latching component 24, so that the child restraint seat 10 can be fixed onto the stroller or the car seat for convenience.

The child restraint seat 10 includes the locking mechanism 14, a seat unit 16 and a releasing handle 18. The seat unit 16 is utilized to hold a kid or an infant. The locking mechanism 14 is disposed on the seat unit 16, and the releasing handle 18 is disposed on another location of the seat unit 16 and connected to the lock releasing component 14, which means application of the locking mechanism 14 can be actuated by using the releasing handle 18. The locking mechanism 14 can include a latch base 20, the first latching component 22, the second latching component 24, a lock releasing component 26, a slot structural component 28 and a resilient component 30. The latch base 20 is disposed on the seat unit 16, the first latching component 22 is rotatably disposed on the latch base 20 and connected to the lock releasing component 26, and the second latching component 24 is movably disposed on rear of the seat unit 16 and connected to the releasing handle 18.

The slot structural component 28 can be disposed on the seat unit 16 and independent of the first latching component 22, the lock releasing component 26 can be slidably disposed inside the slot structural component 28 for linear constraint. The resilient component 30 is disposed between the latch base 20 and the first latching component 22. The releasing handle 18 can be connected to the lock releasing component 26 and the second latching component 24 respectively via connective cables 32. The first latching component 22 can include an axle portion 34, an engaging portion 36 and an inclined portion 38. The axle portion 34 can be rotatably connected with the latch base 20, the engaging portion 36 can be connected with the axle portion 34, and the inclined portion 38 can be disposed on an edge of the engaging portion 36 facing the first external structural unit 11. The lock releasing component 26 is connected with the axle portion 34 and can be pulled by the releasing handle 18 via the connective cable 32.

Figure 8:
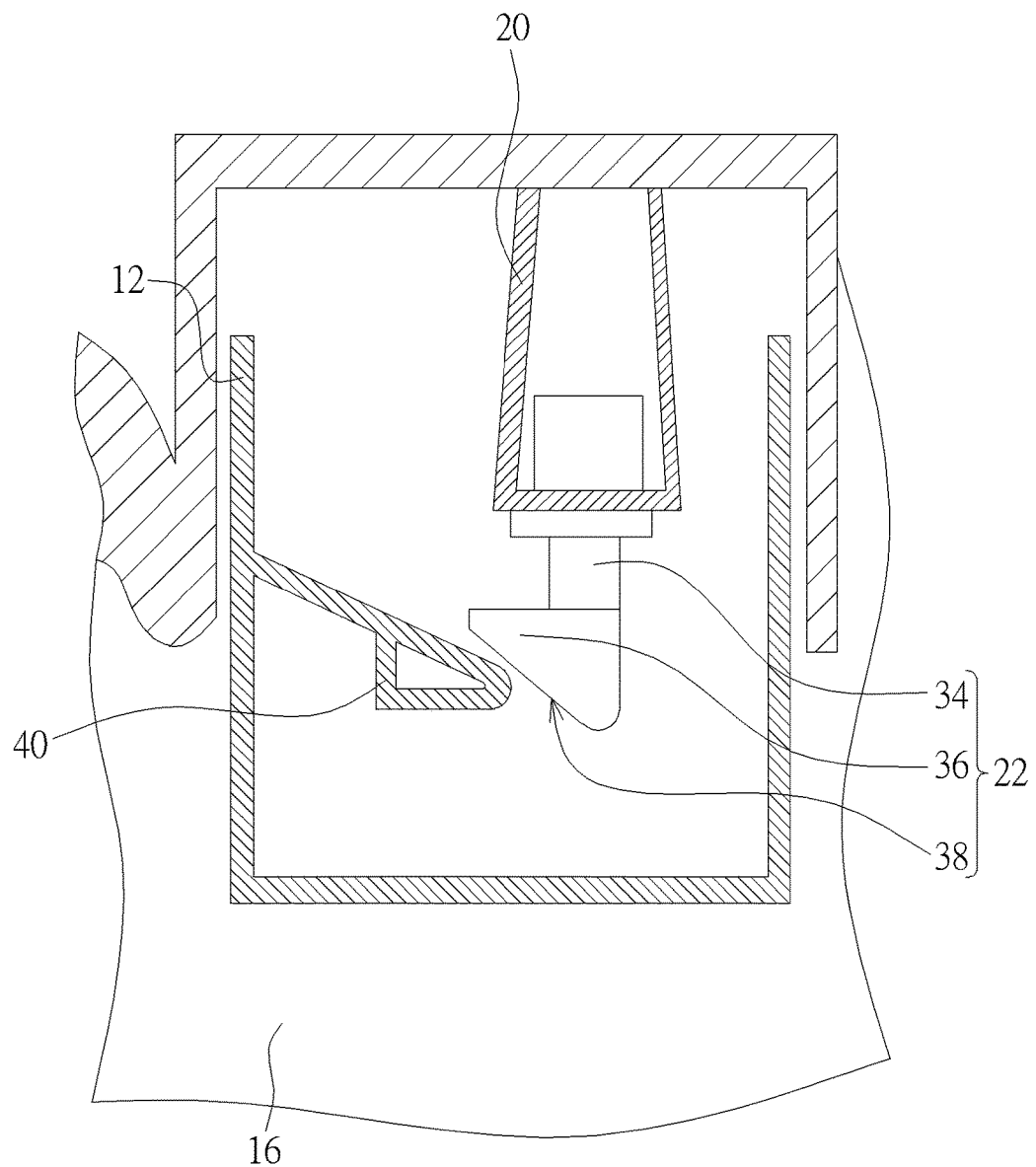
FIG. 8 to FIG. 10 respectively are partial structural diagrams of the child restraint seat in different operation modes according to the first embodiment of the present invention.
Figure 9:
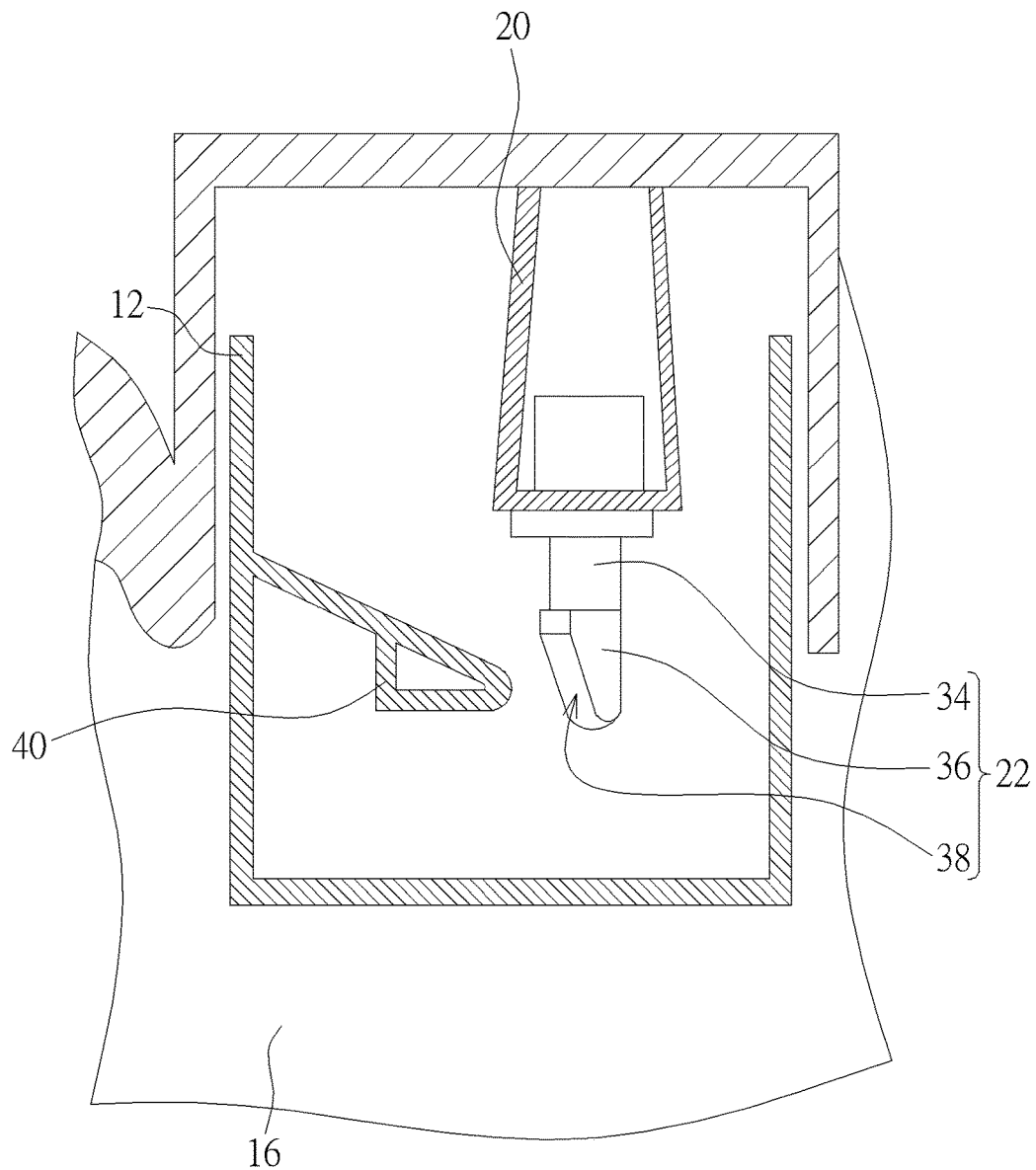
Figure 10:
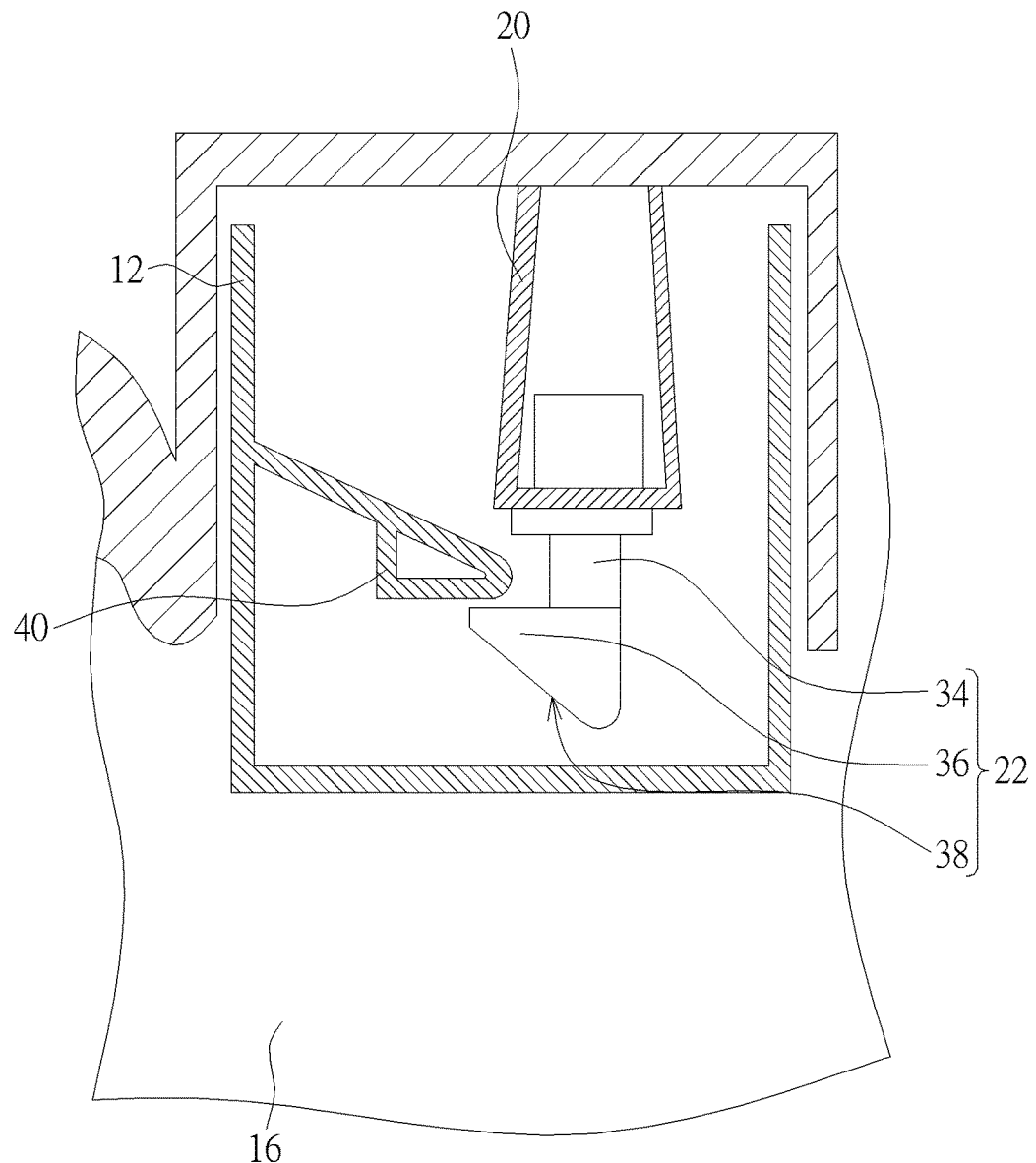

Please refer to FIG. 1 to FIG. 10. FIG. 8 to FIG. 10 respectively are partial structural diagrams of the child restraint seat 10 in different operation modes according to the first embodiment of the present invention. The first latching component 22 is rotatable and can be moved relative to a first constraining component 40 of the first external structural unit 11; as mentioned above, the first external structural unit 11 is the stroller. As shown in FIG. 6, the first latching component 22 is abutted against a bottom of the first constraining component 40 for engagement for engagement, and the second latching component 24 is further utilized to insert into a second constraining component 42 of the second external structural unit 12 when the second external structural unit 12 is the restraint base installed on the car seat. While the releasing handle 18 is pulled, the first latching component 22 is moved from a closed position (shown in FIG. 6) to an open position (shown in FIG. 7), and the second latching component 24 is also moved from a closed position (not shown) to an open position (not shown) simultaneously, such that the first latching component 22 or the second latching component 24 can be disengaged from the first constraining component 40 or the second constraining component 42 for disassembly.

As shown in FIG. 8, the child restraint seat 10 is lowered to approach the first external structural unit 11, the inclined portion 38 of the first latching component 22 slidably contacts against the first constraining component 40, and the axle portion 34 can be rotated by relative slide between the inclined portion 38 and the first constraining component 40; as shown in FIG. 9, the engaging portion 36 is moved from the closed position to the open position, the engaging portion 36 may go across a corner of the first constraining component 40 to be beneath the bottom of the first constraining component 40, and the resilient component 30 can be compressed to store a resilient covering force accordingly. Then, as shown in FIG. 10, the first latching component 22 is lowered, the said resilient covering force is released to rotate the engaging portion 36 from the open position to the closed position, and the engaging portion 36 can be engaged with the first constraining component 40 to constrain a relative movement between the child restraint seat 10 and the first external structural unit 11.

For disassembling the first latching component 22 from the first constraining component 40, the lock releasing component 26 is pulled to linearly slide inside the slot structural component 28, the axle portion 34 is rotated accordingly, the engaging portion 36 can be separated from the first constraining component 40 in accordance with rotation of the axle portion 34, which means the engaging portion 36 is moved from the closed position shown in FIG. 10 to the open position shown in FIG. 9, and the child restraint seat 10 can be detached from the first external structural unit 11 without structural interference between the first latching component 22 and the first constraining component 40.

Figure 11:
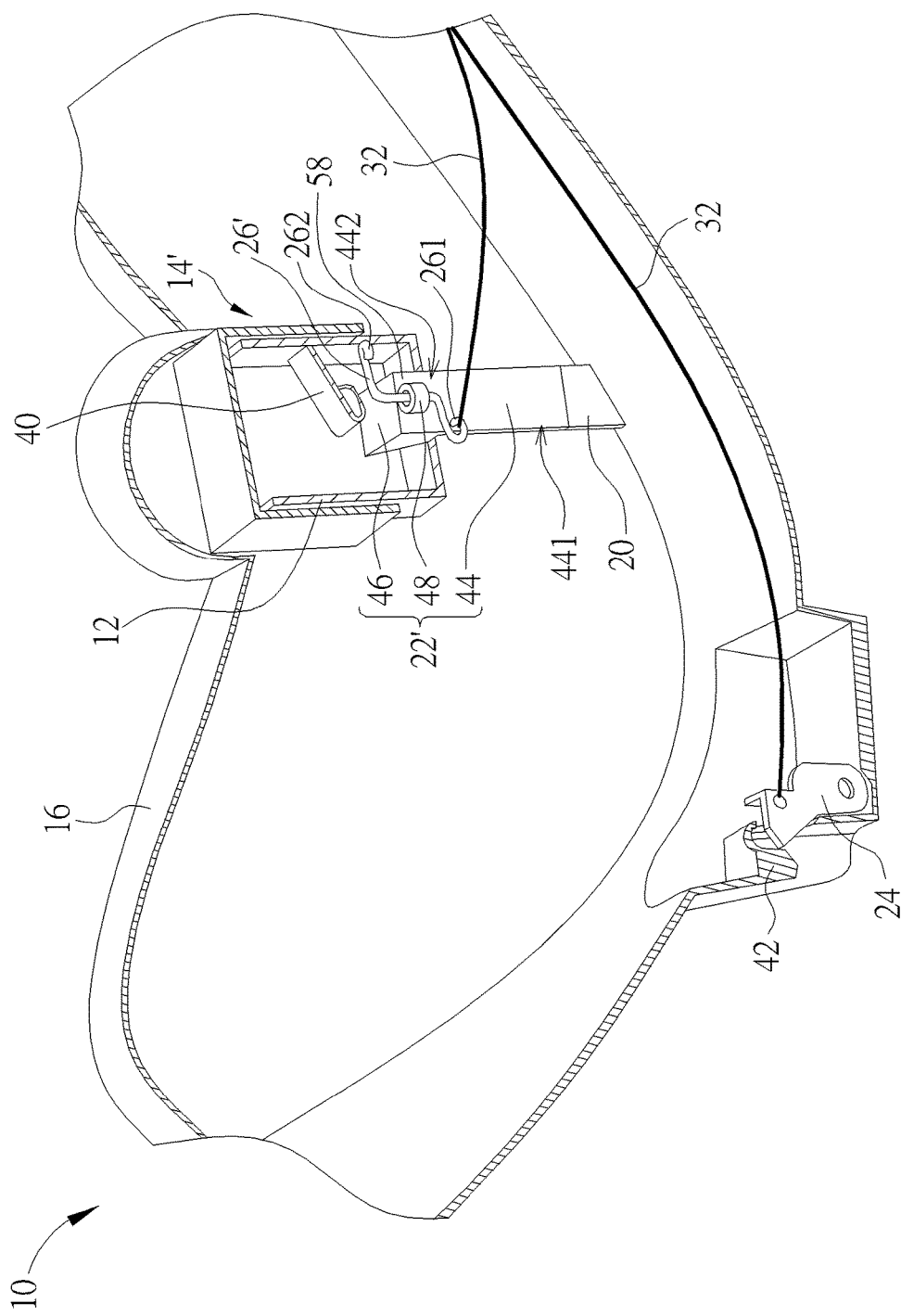
FIG. 11 and FIG. 12 respectively are partial structural diagrams of the child restraint seat in different operation modes according to a second embodiment of the present invention.
Figure 12:
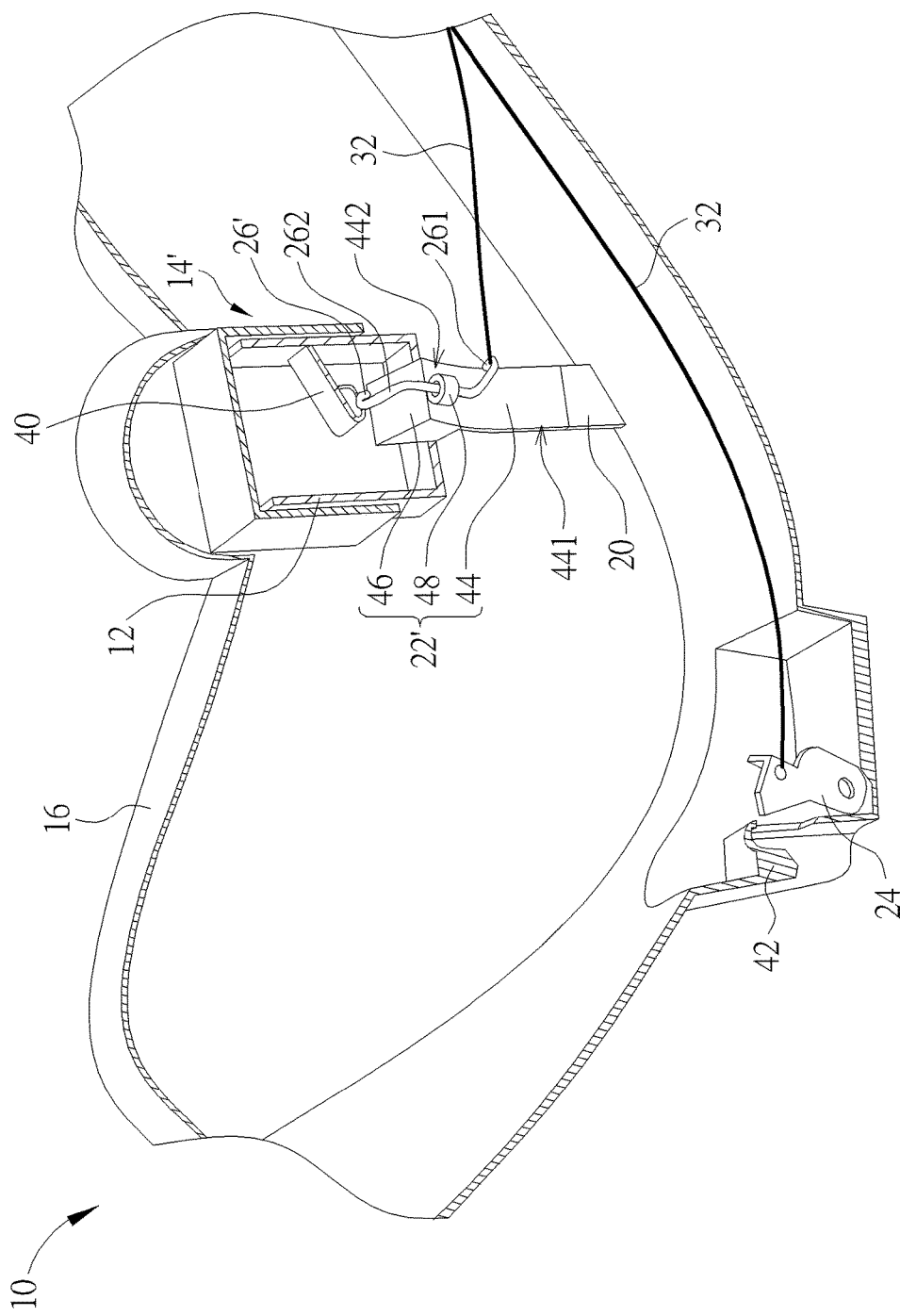

Please refer to FIG. 11 and FIG. 12. FIG. 11 and FIG. 12 respectively are partial structural diagrams of the child restraint seat 10 indifferent operation modes according to a second embodiment of the present invention. In the second embodiment, elements having the same numeral as one of the first embodiment have the same structures and functions, and a detailed description is omitted herein for simplicity. A locking mechanism 14' of the child restraint seat 10 has a first latching component 22' including a stretching portion 44, an engaging portion 46 and a resilient component 48. An end 441 of the stretching portion 44 can be fixed onto the latch base 20, and the engaging portion 46 can be disposed on the other opposite end 442 of the stretching portion 44. The lock releasing component 26' can be rotatably disposed on the first latching component 22'. A first end 261 of the lock releasing component 26' is connected of the releasing handle 18 via the connective cable 32, and a second end 262 of the lock releasing component 26' is rotatable for contacting against the first constraining component 40.

As shown in FIG. 11, the stretching portion 44 is straight without deformation, the engaging portion 46 is located on the closed position and engaged with the first constraining component 40, and the resilient component 48 disposed between the lock releasing component 26' and the first latching component 22' is uncompressed; the second end 262 of the lock releasing component 26' does not contact the first constraining component 40. In the second embodiment, the releasing handle 18 can be operated to simultaneously pull the lock releasing component 26' and the second latching component 24 via the connective cables 32. A length of the second end 262 of the lock releasing component 26' may be greater than a length of the engaging portion 46, which means a top of the second end 262 protrudes from an edge of the engaging portion 46 to contact the first constraining component 40 while the lock releasing component 26' is pulled and rotated. As shown in FIG. 12, the second end 262 of the lock releasing component 26' contacts against the first constraining component 40 to outward deform the stretching portion 44, and the engaging portion can be separated from the first constraining component 40 accordingly; in the meantime, the resilient covering force of the resilient component 48 is stored and can be released when the pulling force applied to the lock releasing component 26' is removed.

Figure 13:
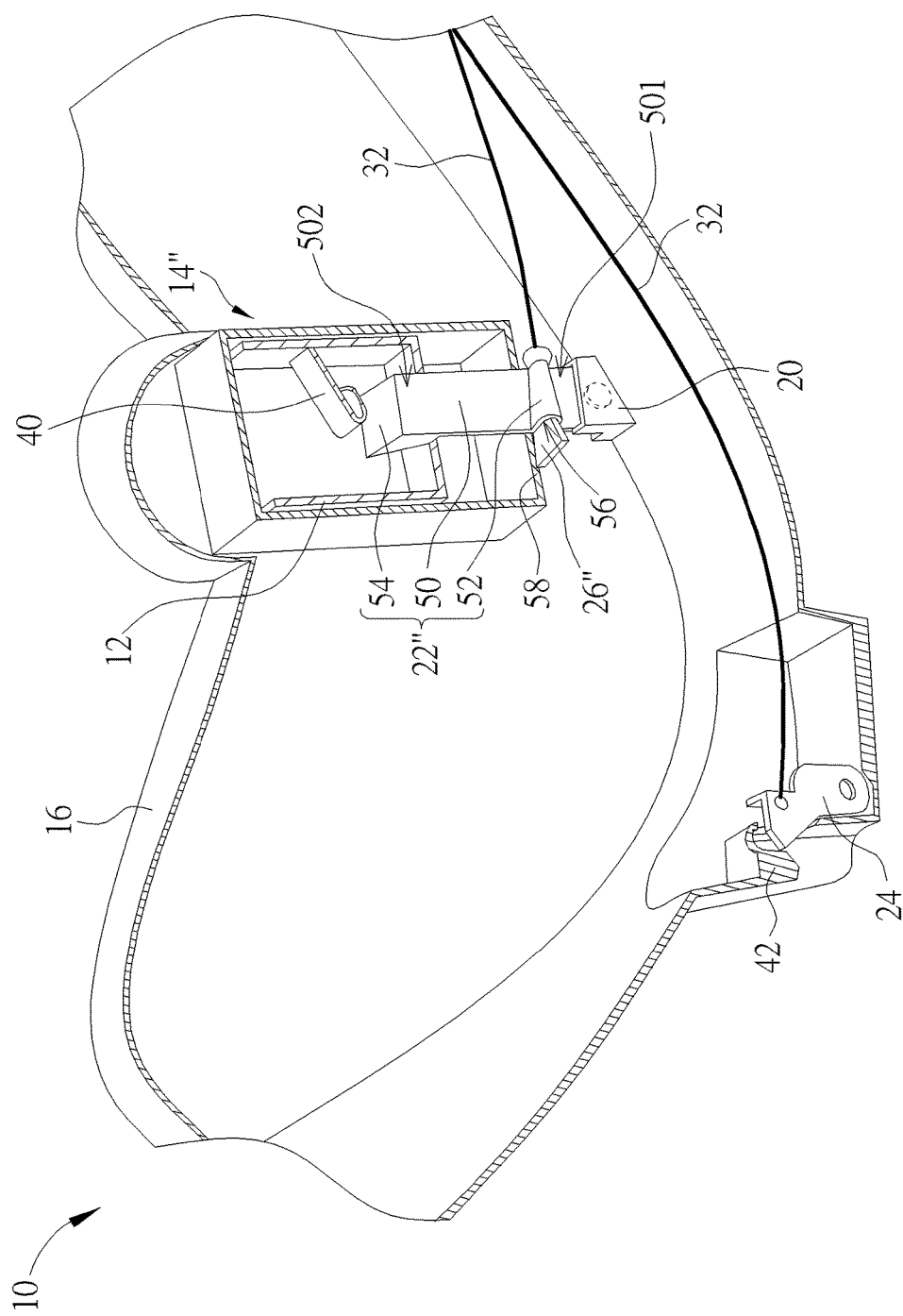
FIG. 13 and FIG. 14 respectively are partial structural diagrams of the child restraint seat in different operation modes according to a third embodiment of the present invention.
Figure 14:
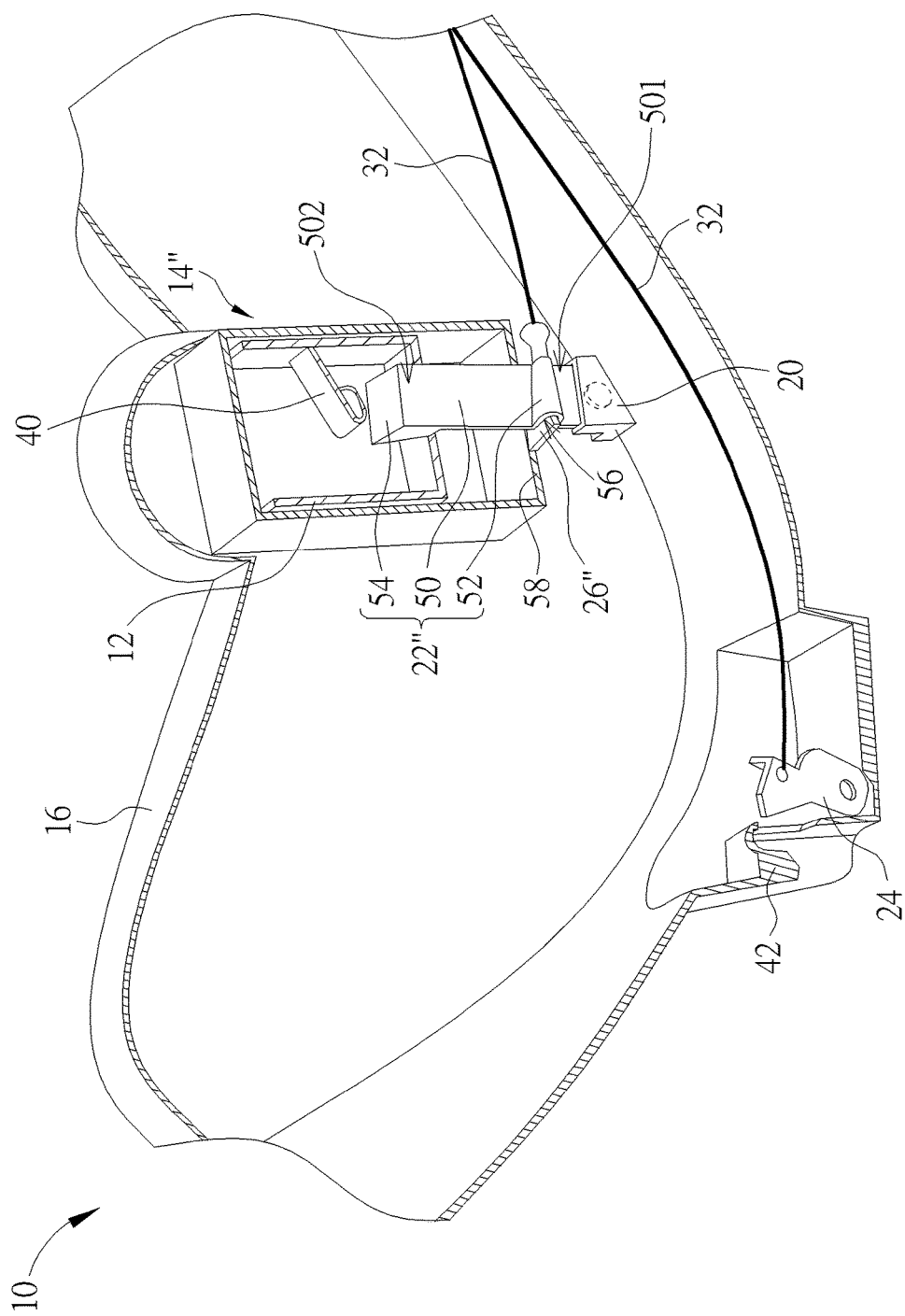

Please refer to FIG. 13 and FIG. 14. FIG. 13 and FIG. 14 respectively are partial structural diagrams of the child restraint seat 10 in different operation modes according to a third embodiment of the present invention. In the third embodiment, elements having the same numeral as one of the foresaid embodiments have the same structures and functions, and a detailed description is omitted herein for simplicity. In the third embodiment, a locking mechanism 14" of the child restraint seat 10 has a first latching component 22" including a bridging portion 50, a crooked portion 52 and an engaging portion 54 connected with each other. The crooked portion 52 can be disposed on a middle of the bridging portion 50. A first end 501 of the bridging portion 50 can be fixed onto the latch base 20, and a second end 502 of the bridging portion 50 opposite to the first end 501 can be connected to the engaging portion 54. The lock releasing component 26" can be slidably accommodated inside the crooked portion 52.

A sunken structure 56 of the crooked portion 52 may have two ends with different depths, and the lock releasing component 26" can accordingly have two ends with different widths and be movably accommodated inside the sunken structure 56. The lock releasing component 26" can be slid inside the crooked portion 52 and simultaneously contact against a restrict portion 58 of the latch base 20, and then the bridging portion 50 can be deformed to move the engaging portion 54 between the closed position and the open position. As shown in FIG. 13, a small-width end (its right end) of the lock releasing component 26" is located inside the sunken structure 56, a large-width end (its left end) of the lock releasing component 26" is out of the sunken structure 56, the bridging portion 50 is not deformed, and the engaging portion 54 is engaged with the first constraining component 40. As shown in FIG. 14, the first latching component 22" is pulled by the connective cable 32, the large-width end of the lock releasing component 26" is moved from a deep-depth end (the left end) to a shallow-depth end (the right end) of the sunken structure 56; therefore, a part of the lock releasing component 26" can protrude from the sunken structure 56 to outwardly press the bridging portion 50, the bridging portion 50 is deformed and spaced from the bridging portion 50, and the engaging portion 54 can be disengaged from the first constraining component 40 accordingly.

In conclusion, the child restraint seat of the present invention utilizes the locking mechanism to fix the seat unit onto the first external structural unit or the second external structural unit. The locking mechanism preferably has two first latching components respectively disposed on each handle of the seat unit, and has one second latching component disposed on the rear or the front of the seat unit. The first latching component can be engaged with and disengaged from the first constraining component via deformation or rotation; the second latching component can be engaged with and disengaged from the second constraining component by pulling the connective cable. When the seat unit is fully installed on the first external structural unit, the first latching component can be automatically returned from the open position to the closed position. Besides, the seat unit can be removed from the first external structural unit by actuating the releasing handle which simultaneously moves the first latching component and the second latching component from the closed positions to the open positions for convenient operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint seat capable of being detachably assembled with a first external structural unit, the restraint seat comprising:
   a seat unit;
   a locking mechanism disposed on the seat unit and adapted to fix the seat unit onto the first external structural unit, the locking mechanism comprising:
      a latch base disposed on the seat unit;
      a first latching component movably disposed on the latch base and adapted to move relative to a first constraining component of the first external structural unit for switching between a closed position and an open position, wherein the first latching component comprises a plate-shaped portion and an engaging portion connected with each other; and
      a lock releasing component connected to the first latching component, wherein a motion of the lock releasing component relative to a restrict portion of the latch base drives deformation of the plate-shaped portion for shifting the engaging portion; and
   a releasing handle disposed on the seat unit and connected to the lock releasing component, the releasing handle being utilized to drive the lock releasing component to move the first latching component from the closed position to the open position.

2. The child restraint seat of claim 1, wherein the first latching component comprises a stretching portion belonging to the plate-shaped portion, an end of the stretching portion is fixed onto the latch base, and the engaging portion is disposed on the other opposite end of the stretching portion.

3. The child restraint seat of claim 2, wherein the lock releasing component is rotatably disposed on the first latching component, a first end of the lock releasing component is connected to the releasing handle, and a second end of the lock releasing component different from the first end is rotated to contact against the first constraining component for deforming the stretching portion.

4. The child restraint seat of claim 3, wherein the engaging portion is separated from the first constraining component via deformation of the stretching portion.

5. The child restraint seat of claim 3, wherein the lock releasing component is rotatably disposed on the stretching portion, and a length of the second end of the lock releasing component is greater than a length of the engaging portion.

6. The child restraint seat of claim 2, wherein the locking mechanism further comprises a resilient component disposed between the lock releasing component and the first latching component.

7. The child restraint seat of claim 1, wherein the first latching component comprises a bridging portion and a crooked portion, the bridging portion belongs to the plate-shaped portion, the crooked portion whereon the lock releasing component is accommodated is disposed on a middle of the bridging portion, a first end of the bridging portion is fixed onto the latch base, and a second end of the bridging portion opposite to the first end is connected to the engaging portion.

8. The child restraint seat of claim 7, wherein the lock releasing component is movably accommodated inside the crooked portion and slidably contacts against a restrict portion of the latch base, a slide of the lock releasing component relative to the restrict portion drives deformation of the bridging portion for shifting the engaging portion.

9. The child restraint seat of claim 7, wherein while the lock releasing component is slid inside the crooked portion, the bridging portion is deformed and the engaging portion is separated from the first constraining component.

10. The child restraint seat of claim 7, wherein a sunken structure of the crooked portion has two ends with different depths, and the lock releasing component having two ends with different widths is movably accommodated inside the sunken structure.

11. The child restraint seat of claim 10, wherein while a large-width end of the lock releasing component is moved from a deep-depth end of the sunken structure to a shallow-depth end of the sunken structure, a part of the lock releasing component protrudes from the sunken structure to space the bridging portion from the latch base.

* * * * *